ELECTRICAL SIGNALLING SYSTEMS

Filed May 26, 1953 2 Sheets-Sheet 1

Inventors George Thomas Baker
Raymond Beaufoy
by Dowe Steinberg
Attorney

Sept. 30, 1958 R. BEAUFOY ET AL 2,854,655

ELECTRICAL SIGNALLING SYSTEMS

Filed May 26, 1953 2 Sheets-Sheet 2

Inventors
Raymond Beaufoy and George Thomas Baker
by Dessoe Steinherz
Attorney

United States Patent Office 2,854,655

Patented Sept. 30, 1958

2,854,655

ELECTRICAL SIGNALLING SYSTEMS

Raymond Beaufoy and George Thomas Baker, Taplow, England, assignors to British Telecommunications Research Limited, Taplow, England, a British company Application May 26, 1953, Serial No. 357,528

Claims priority, application Great Britain May 27, 1952

4 Claims. (Cl. 340—174)

Figure 1:
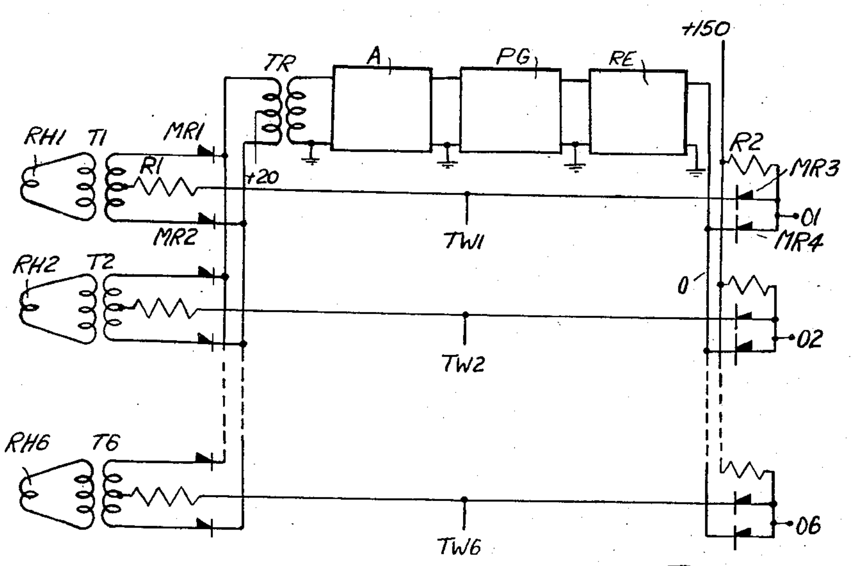

The present invention relates to electrical signalling systems and is more particularly concerned with high-speed storage devices, for instance of the so-called magnetic drum type. It will be understood that the term "drum" is intended to cover also a disc or an endless tape though these forms might not be so convenient in practice.

It is often found with this type of equipment that even where information stored at the storage device is used sequentially in the order in which it was recorded, the speed of withdrawal is less than the speed of insertion and in some cases these speeds differ widely. The possibility therefore arises, if the most economical use is to be made of the equipment, of using some of the responding equipment in common, with suitable switching arrangements to ensure that the information extracted is directed to the appropriate destination.

A particular case where circumstances of this kind arise is disclosed in the co-pending application of G. T. Baker Serial No. 300,431 filed July 23, 1952 where it is explained how the interruptions produced in a telephone subscriber's loop during a dialling operation are recorded on a magnetic drum and subsequently control the generation of corresponding trains of impulses. The drum is used in common by a number of subscribers' lines and it is found that in order to be certain of detecting every change in the condition of the subscriber's loop a scanning operation including the writing heads should take place every 16⅔ milliseconds. However if the information is to be read off in the form of standard pulses at the rate of 10 per second, it is sufficient for the reading heads to scan every 100 milliseconds. Thus the scanning operation for reading off can be much slower and in fact a reading operation is only required every six writing scans. Consequently economy in equipment can be obtained if it is arranged that the reading-off equipment is common to six storage circuits with which it is associated in turn and it is the chief object of the invention to enable this to be done.

According to the invention in an arrangement for a high-speed storage device of the magnetic drum type arranged for the storage of information to be effected at a much higher speed than the withdrawal of the stored information and including a plurality of circumferential storage tracks each track having an associated writing head and reading head, a set of signal transmitting equipment is individually associated with each writing head while a set of signal receiving equipment is provided in common to all the reading heads with which it is sucessively associated in turn by distributing equipment synchronised with the drum.

The invention will be better understood from the following description of its application to a storage device of the magnetic drum type, for instance used in the manner indicated in the above mentioned specification. Since the use of drums of this type is now established, details of the actual drum will not be shown but Fig. 1 of the accompanying drawing merely shows sufficient of the circuit arrangements to enable the invention to be properly understood while Fig. 3 shows schematically how these circuits are related to the drum itself.

It is assumed that, as in the specification previously referred to, by means of suitable writing heads the drum serves to record trains of impulses dialled by any one of a number of calling telephone subscribers and that by means of suitable reading heads the record made on the drum subsequently controls the transmission of standard impulses at the usual rate of 10 per second either for setting a register device or for the direct operation of automatic switches in the speaking route. The drum is assumed to be provided with a plurality of tracks each with its associated reading and writing heads and a plurality of subscribers' lines, for instance 20, will be accommodated in successive portions of each complete track. It will also be assumed that the figures mentioned above for frequency of scanning in the two cases are applicable so that the reading-off equipment can be provided in common to six tracks. Fig. 1 shows the switching arrangements according to the invention with these assumptions and Fig. 2 indicates the spacing and relationship of the various timing waveforms used for controlling suitable switching operations to produce the desired effect in the working of the apparatus. These waveforms may be produced in known manner by various combinations of toggle circuits controlled from a separate track on the drum which carries synchronising markings so that the timing waveforms are synchronised with the rotation of the drum.

Figure 2:
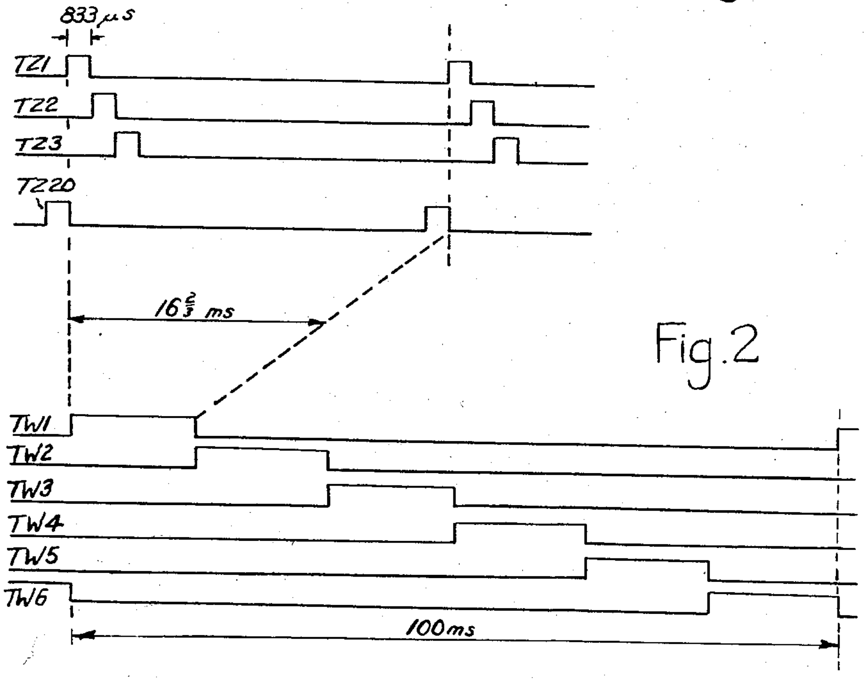

Referring first to Fig. 2, it is assumed that the drum performs one revolution in 16⅔ milliseconds, that is to say a speed of 3600 R. P. M. Since during each revolution 20 subscribers' lines are dealt with, the period appropriate to each line is 833 microseconds and the waveforms which produce the appropriate switching as between different subscribers' lines are indicated in Fig. 2 and have been designated TZ1, TZ2, TZ3 . . . TZ20. The lower part of Fig. 2, which is on a smaller scale, indicates the provision of the TW waveforms TW1–TW6 appropriate to the different tracks. Each period of increased potential accordingly lasts 16⅔ milliseconds and they occur successively so that the six occupy 100 milliseconds corresponding to the scan interval for reading off. The manner of use of these TW pulses will be apparent from Fig. 1 and it will be explained subsequently that the increased potential serves to alter the bias on a rectifier network which thus acts as a gate circuit. It should be mentioned that the TZ waveforms are the same as those referred to in the earlier specification though they are not strictly concerned with the present invention.

Figure 3:
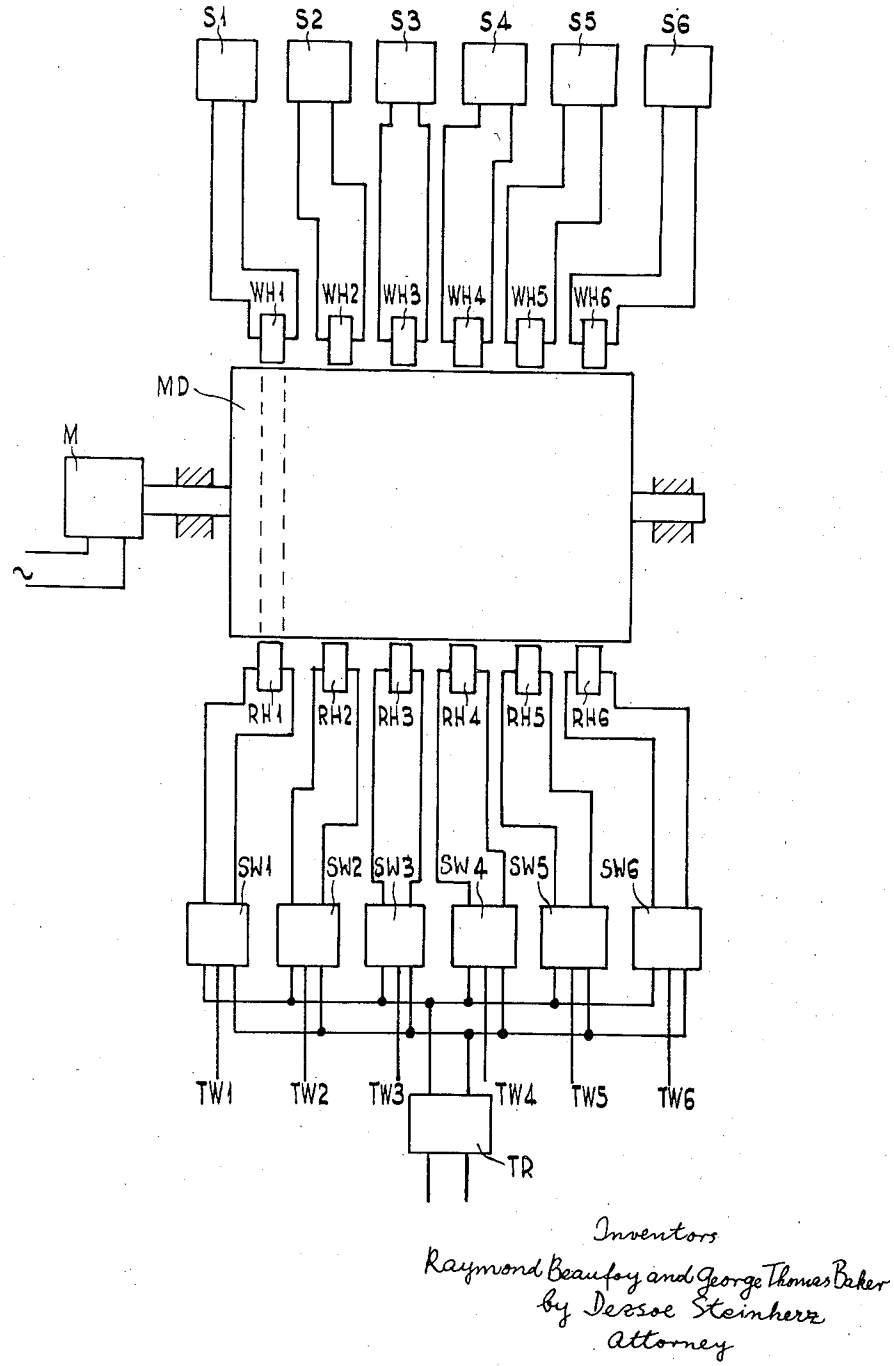

Considering now the general layout of Fig. 3, in this figure the magnetic drum MD is shown diagrammatically as being arranged to rotate about a horizontal axis in conventional bearings and to be driven by the electric motor M. The drum is assumed to be provided with six tracks one of which is indicated by the dotted line and is provided with a group of co-operating writing heads. These are marked WH1–WH6 and they are directly associated respectively with suitable individual signal sources. These are included in the rectangles S1–S6 which are assumed to contain also the necessary equipment for converting the signals into writing head currents.

For each track there is provided a reading head and the various heads RH1–RH6 are shown as mounted on the opposite side of the drum though this is in no sense necessary. Associated with each reading head is a switching unit such as SW1 associated with the reading head RH1 and it will be understood that the switching unit represents the equipment shown in Fig. 1 comprising in the case of the switching unit SW1 the transformer T1, resistor R1 and the rectifiers MR1 and MR2.

Fig. 3 also shows the connections to the various switching units of the leads carrying the waveforms TW1–TW6 to which an increased potential is connected in turn in the manner indicated in Fig. 2. The outputs from the various switching units are commoned as shown also in Fig. 2 and extend to the common transformer TR which in Fig. 3 is shown as a block. It is assumed that in Fig. 3 as in Fig. 2 connections extend from the common transformer to an amplifier A, pulse generator PG and reading-off equipment RE as shown in Fig. 1.

It will be appreciated that with this arrangement the writing heads WH1–WH6 are continuously effective and are able to effect writing at any time. The reading heads RH1–RH6 however are successively effective in turn each sixth revolution under the control of the waveforms carried by leads TW1–TW6. As already pointed out this enables the writing heads to record impulses in accordance with dialling over a telephone subscriber's line while the reading heads are effective sufficiently frequently to enable the transmission of corresponding outgoing impulses at a frequency of 10 impulses per second. By this means it is readily possible to make use of common amplifying and pulse shaping equipment in common for a plurality of reading heads with a corresponding economy in apparatus.

Considering now Fig. 1, the reading heads associated with the six different tracks are designated RH1–RH6 and they are connected respectively to transformers T1–T6. Only the equipment for tracks 1, 2 and 6 has been shown however in order to avoid unnecessary repetition in the drawing. Dealing particularly with transformer T1, this is provided with a centre-tapped secondary to which the lead carrying waveform TW1 is connected by way of a resistor R1. The ends of the secondary of transformer T1 are connected to the common transformer TR by way of rectifiers MR1 and MR2 which are similarly poled. The primary of the transformer TR is also centre-tapped and is connected to a steady potential of suitable value for instance +20 volts as shown. The other transformers T2–T6 are similarly connected but the centre tappings of the secondaries extend to the appropriate leads carrying the waveforms TW2–TW6. Since the periods of increased potential do not overlap and serve to render the rectifiers conductive each reading head is associated with transformer TR in turn without interference from the others.

The secondary of the transformer TR is connected to an amplifier A the output of which is passed to a pulse generator PG. This equipment, full circuits of which are shown in Beaufoy Patent No. 2,797,320 granted June 25, 1957 serves to produce squared pulses of uniform amplitude and length from the somewhat distorted pulses derived from the reading heads. In effect the pulse generator produces standard rectangular pulses at a uniform rate and these are included or suppressed in the output dependent on the polarity of the pulses picked up by the reading heads at the instant of sampling represented by the leading edge of the driving pulses. The pulses pass to the reading-off equipment RE from which are sent out the necessary pulses to effect the reading off of digits from the appropriate track. These pulses must be distributed in turn to the control equipment associated with the various tracks.

This is effected by the use of coincidence circuits of known type and that for the first track comprises a pair of rectifiers MR3, MR4 associated with a resistor R2 and a steady source of positive potential, for instance 150 volts. The connection from the reading-off equipment extends over lead O to all the track outputs by way of the individual rectifiers while the respective TW pulses extend by way of further individual rectifiers in parallel therewith. The effect is that the output of the common reading-off equipment represented by an increase in potential will only be passed to any particular one of the track outputs extending to terminals O1, O2 . . . O6 during the increased potential portion of the corresponding TW waveform. Consequently since the control pulses TW do not overlap, only one track output is served at a time and owing to the fact that the TW waveforms operate at both ends of the equipment, the signals picked up by the reading head RH1 of track 1 will pass to the output terminal O1 of track 1 by way of the common reading-off equipment and similarly for the other tracks.

We claim:

1. In a magnetic storage system, a magnetic drum, means for rotating said drum about its axis, a plurality of writing heads co-operating respectively with different circumferential tracks on said drum, a like plurality of signal transmitting equipments individually associated with said writing heads, a plurality of reading heads co-operating respectively with said different tracks, amplifying and pulse generating equipment common to all of said reading heads, a plurality of output terminals corresponding to said plurality of reading heads, and distributing arrangements synchronised with the movement of said drum for associating said reading heads in turn with the input to said common equipment and the output from said common equipment with said output terminals in turn.

2. In a magnetic storage system as claimed in claim 1, a first transformer having a primary winding and a centre-tapped secondary winding, connections from the primary of said transformer to one of said reading heads, a first pair of rectifiers, a common reading transformer having a centre-tapped primary, connections from the secondary of said first transformer by way of said rectifiers to the primary of said reading transformer, connections from the secondary of said reading transformer to said amplifying and pulse generating equipment, a plurality of further transformers and pairs of rectifiers associated respectively with the remainder of said reading heads and connected to said reading transformer in the same manner as said first transformer and first pair of rectifiers, means for connecting steady potential to the centre tapping of the primary of said reading transformer and means for connecting control potential successively in turn to the centre tappings of the secondaries of said first and further transformers.

3. In a magnetic storage system, a magnetic drum, means for rotating said drum about its axis, a plurality of writing heads co-operating respectively with different circumferential tracks on said drum and arranged to be continuously effective, a like plurality of signal transmitting equipments individually associated with said writing heads, a plurality of reading heads co-operating respectively with said different tracks, and distributing arrangements synchronised with the movement of said drum for rendering said reading heads effective successively in turn to extract the information represented by the signals received from said signal transmitting equipments and recorded by said writing heads whereby the scanning interval for the reading head associated with any one track is a multiple of the scanning interval for the corresponding writing head.

4. In a magnetic storage system, a magnetic drum, means for rotating said drum about its axis, a plurality of writing heads co-operating respectively with different circumferential tracks on said drum and arranged to be continuously effective, a like plurality of signal transmitting equipments individually associated with said writing heads, a plurality of reading heads co-operating respectively with a said different track, amplifying and pulse generating equipment common to all of said reading heads, and distributing arrangements synchronized with the movement of said drum for rendering said reading heads effective successively in turn by associating them with the input to said common equipment.

References Cited in the file of this patent

UNITED STATES PATENTS

| | | |
|---|---|---|
| 2,554,886 | Stedman et al. | May 29, 1951 |
| 2,570,716 | Rochester | Oct. 9, 1951 |
| 2,575,342 | Gridley | Nov. 20, 1951 |
| 2,587,532 | Schmidt | Feb. 26, 1952 |
| 2,592,737 | Reynolds et al. | Apr. 15, 1952 |
| 2,611,025 | Jankowski | Sept. 16, 1952 |
| 2,614,169 | Cohen et al. | Oct. 14, 1952 |
| 2,698,875 | Greenwood | Jan. 4, 1955 |
| 2,714,843 | Hooven | Aug. 9, 1955 |
| 2,729,803 | Harrison | Jan. 3, 1956 |